United States Patent [19]

Susi et al.

[11] Patent Number: 5,286,542
[45] Date of Patent: Feb. 15, 1994

[54] WELDED NON-WOVEN ENDLESS BELT

[75] Inventors: Michael F. Susi, Newington; Thomas E. Pramuka, Cromwell, both of Conn.

[73] Assignee: Advanced Belt Technology, Middletown, Conn.

[21] Appl. No.: 899,373

[22] Filed: Jun. 16, 1992

[51] Int. Cl.$^5$ .................. B32B 3/00; B32B 27/00; D04H 1/04; G01J 3/30
[52] U.S. Cl. .................................. 428/58; 428/57; 428/286; 428/287; 428/290; 428/296; 355/212; 355/312
[58] Field of Search ............... 355/312, 212; 428/57, 428/58, 286, 287, 290, 296

[56] References Cited

U.S. PATENT DOCUMENTS

| | | | |
|---|---|---|---|
| 2,576,882 | 11/1951 | Koole et al. | 198/691 |
| 3,026,225 | 3/1962 | Ostby, Jr. | 428/57 |
| 3,339,469 | 9/1967 | McFarlane | 355/212 |
| 3,437,336 | 4/1969 | Enke et al. | 198/691 |
| 3,482,676 | 12/1969 | Fackler | 198/847 |
| 3,542,633 | 11/1970 | Goldsmith | 428/131 |
| 3,584,733 | 6/1971 | Isermann | 198/691 |
| 3,986,773 | 10/1976 | Marx et al. | 198/640 |
| 4,244,465 | 1/1981 | Hishikawa et al. | 198/691 |
| 4,287,984 | 9/1981 | Okamoto et al. | 198/847 |
| 4,435,457 | 3/1984 | Servo et al. | 428/58 |
| 4,526,357 | 7/1985 | Kuehnle et al. | 271/193 |
| 4,719,136 | 1/1988 | Zwirner | 428/58 |
| 4,758,486 | 7/1988 | Yamazaki et al. | 355/212 |
| 4,823,942 | 4/1989 | Martin et al. | 271/193 |
| 4,937,117 | 1/1990 | Yu | 428/57 |
| 5,103,263 | 4/1992 | Moore et al. | 355/212 |
| 5,119,133 | 6/1992 | Swain | 355/212 |

Primary Examiner—George F. Lesmes
Assistant Examiner—Terrel Morris
Attorney, Agent, or Firm—Larson and Taylor

[57] ABSTRACT

A composite endless belt for use in printers, imaging devices and the like comprises a nonwoven, porous, open pore thermoplastic substrate having one or more electrically conductive elastomeric coatings thereon. The substrate, which comprises a combination of short fibers and fibrids or a randomly laid continuous fiber, is formed into an endless loop and the overlapping ends thereof are welded together ultrasonically. The belt is very thin, the combined thickness of the substrate and coating or coatings being less than about 0.015 inches.

12 Claims, 1 Drawing Sheet

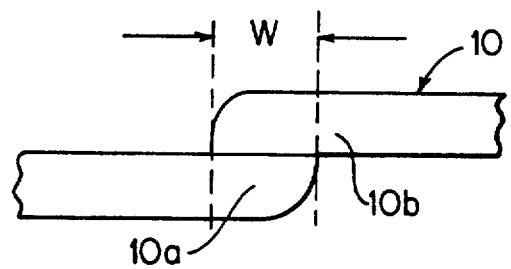
FIG. 1
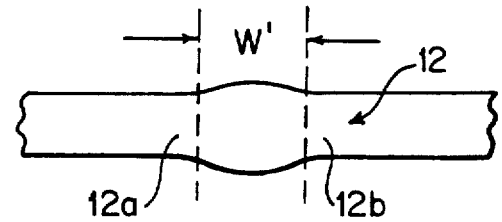
FIG. 2
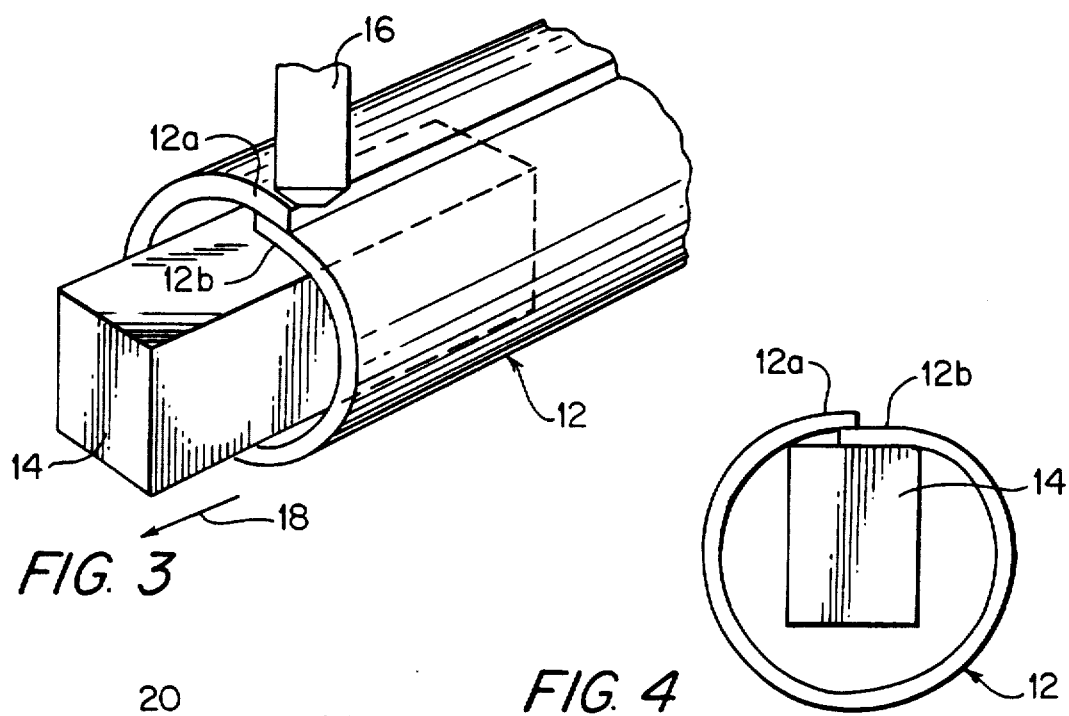
FIG. 3
FIG. 4
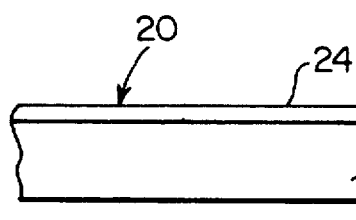
FIG. 5(a)
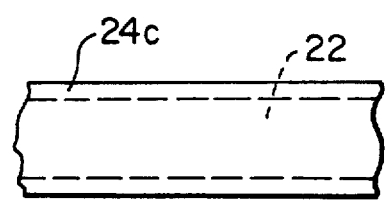
FIG. 5(c)
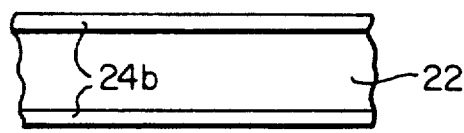
FIG. 5(b)
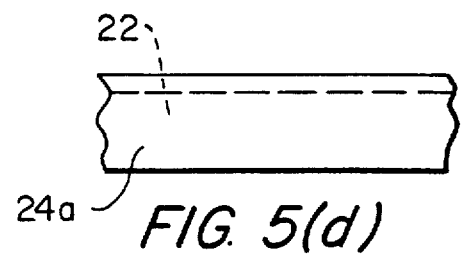
FIG. 5(d)

WELDED NON-WOVEN ENDLESS BELT

FIELD OF THE INVENTION

The present invention generally relates to endless belts such as are used, for example, in printers and imaging devices and, more particularly, to an electrically conductive, nonwoven endless belt of a very small thickness, and to a method for making the same.

BACKGROUND OF THE INVENTION

Certain printers and imaging devices and machines require the use of a belt in the printing or imaging region of the device or machine. Depending on the particular application, the belt may be used to perform any one of several functions. For example, the belt can be used to perform a printer transport function, i.e., to transport and hold paper (or another material to be printed on) in the printing area of a conventional printer. The belt carries paper or the like and positions the same in front of the print head and, after printing, the belt indexes, thereby feeding the printed paper to the next area or section of the machine. The transport and holding function is usually assisted by a vacuum, drawn through perforations in the belt. Endless belts are also used as imaging belts, wherein the belt is charged with an image, the charge on the belt receives a toner and the image is then transferred to paper or another suitable material.

There are a number of important requirements to be met before a belt can be used in such applications. These requirements include, among others, the following: (1) the belt must be seamless or have a minimal or undiscernible seam; (2) the belt must be electrically conductive; (3) the belt must have good temperature resistance characteristics (as is discussed in more detail below); (4) the belt must be flexible; (5) the belt must have customized (controllable) frictional characteristics; (5) the belt must be thin (both for greater flexibility and for heat transfer advantages, as discussed below); and (6) the belt must be resistant to creasing.

There are, of course, a number of belts that are candidates for use in the applications described above but no single prior art belt embodies all of the advantages and meets all of the requirements set forth above. Two principal types of prior art belts are coated, woven endless belting and ultrasonically welded, thermoplastic film belts. The former, i.e., coated, woven, endless belts, possess many of the characteristics discussed above but that technology is not presently capable of providing very thin belts, i.e., belts having a thickness equal to or less than about 0.010 inches. Regarding the second type, although welded plastic (e.g., polyester (Mylar)) film belts have been employed in some applications, there are several problems and disadvantages with such belts in other important applications. For example, because of the thickness increase ("bump") at the weld, the seam shows up when printing on paper over the seam area. Further, when imaging directly onto the belt, i.e., in an application where the belt is used as an imaging belt, the seam also shows up on the paper and the image thereof is transferred. In addition, plastic film belts are easily creased, thus creating handling problems. Further, plastic film materials which are amenable to welding generally do not have the inherent temperature capabilities required. (Again, these requirements in connection with the specific application mentioned previously are discussed in more detail below.) A further disadvantage of plastic film belts is that surface conductivity is not easily achieved and bulk conductivity does not exist in materials meeting the temperature constraints in question. Also, plastic film belts are not very flexible and this is a disadvantage for a number of reasons. For example, where a vacuum assist is used, the vacuum is not as effective. Further, flex life is diminished. A further disadvantage is that plastic film belts are not readily coated, in an endless fashion, with elastomeric materials (such as may be required to render the belts conductive). In this regard, such belts cannot be coated prior to welding in that the coating will greatly inhibit the welding process.

Patents of interest in the field of belts include the following: U.S. Pat. Nos. 4,823,942 (Martin et al); 3,542,633 (Goldsmith); and 3,482,676 (Fackler). The Martin et al patent relates to a document transport belt having a light reflective outer layer and an electrically conductive inner layer. The outer layer is made of ethylene propylene rubber or ethylene propylene diene rubber containing light reflective pigments. The electrically conductive inner layer is made of ethylene/propylene rubber or ethylene/propylene diene rubber containing conductive carbon black. The outer layer and inner layer are joined together to form a plied sheet. Heat and pressure are applied to the plied sheet to cure the base polymer in both layers. The Goldsmith patent relates to an electrically conductive anti-stick conveyor belt. The foraminous substrate of the belt is preferably made of glass fiber cloth, but may be made of other flexible materials. The substrate is provided with openings, either inherently through its weave or directly formed with openings by perforating. The flexible substrate is coated with a fluorocarbon polymer to provide anti-stick properties. This base coating, which is non-conductive, is, in turn, covered with a conductive fluorocarbon coating so that electrostatic charges on the face of the belt can leak off through the conductive coating to the back of the belt to grounded backing plates or rollers. The Fackler patent relates to a belt for a document feeding apparatus having a light reflective outer layer and an electrically conductive inner layer. In a typical example, the outer belt layer is made of a white or light colored polyolefin or neoprene and the inner layer is made of graphite impregnated neoprene. The layers are secured together by bonding.

Other patents of possible interest include the following: U.S. Pat. Nos. 4,526,357 (Kuehnle et al); 4,287,984 (Okamoto et al); 4,244,465 (Hishikawa et al); 3,986,773 (Marx et al); 3,584,733 (Isermann); 3,437,336 (Enke et al); and 2,576,882 (Koole et al).

SUMMARY OF THE INVENTION

In accordance with the invention, a welded porous nonwoven endless belt is provided which is particularly adapted for use in printers and imaging devices and which overcomes the problems with prior art belts discussed above. The belt of the invention basically comprises a nonwoven, porous, open pore thermoplastic substrate ultrasonically welded to form a continuous loop and having an electrically conductive thermoplastic or thermosetting elastomeric coating (or coatings) thereon. The porosity of the substrate is preferably between about 0.1 cubic feet per minute and 25 cubic feet per minute, wherein porosity is defined in terms of amount of air that flows through the substrate in cubic feet per minute (CFM) using the Frazier CFM test method. As discussed below, this porosity or openness enables bulk conductivity to be achieved as well as ensures a substantially smooth weld at the joint between the original belt ends.

As compared with a woven belt, the belt of the invention can be made very thin and, in this regard, depending on the choice of substrate and the amount of coating or coatings applied thereto, the composite belt thickness can range from 0.002 inches to 0.015 inches. In general, the applications discussed above typically require a finished overall thickness of no more than 0.010 inches and as the highest thickness in the range set forth above is approached, the advantages of the invention diminish as compared with other available products. In addition to thinness, the belt of the present invention is flexible and in this regard, has much greater flexibility than a conventional plastic film. Moreover, the belt of the invention does not easily crease. Further, as noted above, the belt has a minimal thickness increase ("bump"), if any, at the weld. In addition, the belt can be made surface conductive, bulk conductive or both and the ability of the belt to be made bulk conductive is substantially advantageous as discussed below. Further, the temperature resistance thereof is greater than conventional "weldable" plastic films. Also, the belt is easily coated and thus a choice is provided as to the frictional characteristics of the belt which is desirable in matching the belt to a particular application. Thus, in summary, the belt of the invention fulfills all of the basic requirements which must be met in the applications discussed above.

Other features and advantages of the invention will be set forth in, or apparent from, the following detailed description of preferred embodiments of the invention.

BRIEF DESCRIPTION OF THE DRAWINGS

FIG. 1 is a schematic side elevational view of a portion of prior art belt showing the seam or joint;

FIG. 2 is a schematic side elevational view of a portion of a belt according to the present invention showing the seam or joint for comparative purposes;

FIGS. 3 and 4 are schematic perspective and end elevational views, respective, showing the use of ultrasonic welding in joining together the ends of a belt in accordance with the invention; and FIGS. 5(a) to 5(d) are schematic side elevational views of different embodiments of the belt of the invention.

DESCRIPTION OF THE PREFERRED EMBODIMENTS

As set forth above, the belt of the invention comprises a porous nonwoven substrate. The substrate can be made of any suitable thermoplastic having a porosity that will provide an essentially smooth weld as well as bulk conductivity. Examples of such materials include polyester and aramid. The substrate preferably comprises a combination of short fibers and fibrids (filmy particles), or a randomly laid continuous fiber. It is believed that the openness or porosity of the substrate enables bulk conductivity to be achieved as well as results in the essentially smooth weld (a minimal increase in thickness at the weld) referred to above.

Bulk conductivity, which is also known as volume resistivity, is the ratio of the potential (voltage) gradient measured in the direction of the current flow in a material to current density in the material, and the standard unit of measure is the ohm-centimeter. Substantial or significant bulk conductivity is desirable in the belt of the invention and it is an advantage of the invention that such bulk conductivity can be achieved. In this regard, a drive system employing a bulk conductive belt can dissipate any possible triboelectric charge buildup, e.g., simply by grounding a pulley. Otherwise, i.e., without this feature, additional equipment, e.g., a brush, is required. Further, a bulk conductive belt is not a source of static. Bulk conductivity in the belt of the invention is provided by the conductive coating and in accordance with a preferred embodiment of the invention, conductive carbon black added to a polymer coating provides the desired conductivity. The range of loading of electrically conductive carbon black is on the order of 40 to 90 parts per hundred parts of raw polymer. Of course, this loading may be varied depending upon the polymer selected and the particular balance of properties that are desired. Suitable polymers include ethylene-propylene diene monomer (EPDM), polychloroprene (Neoprene), nitrile, urethane, and fluoroelastomers.

Considering in more detail the temperature requirements placed on a belt in the applications discussed above, it is noted that the use of a belt in a printer transport application requires resistance to continuous temperatures of 230° F. to 250° F. and resistance to intermittent or noncontinuous temperatures of 350° F. to 400° F. The former requirement is a product of the need to combat the effect of the radiant heat received by the belt because of the proximity of the print head to the belt. The latter, higher temperature condition can occur when there is a misfeed of the paper or a misfire from the print head in that, in such a situation, hot ink can be sprayed directly onto the belt. A very important advantage of the belt of the invention in this situation over a conventional plastic film belt is that the latter will shrink and distort permanently in the area where the ink or the high temperature has had an effect. In contrast, with the belt of the invention, the distortion is minimal and, more importantly, any distortion is reversible. In other words, when the ink is scraped off, the belt returns to its original flat state.

With respect to the use of a belt in an imaging application, the temperature requirements are resistance at 300° F. to 350° F. The belt of the present invention does not distort at these temperatures, in contrast to film materials that can be seamed to form a belt. In this regard, it is noted that Kapton, for example, is a film material that can withstand the temperatures discussed above without distortion. However, Kapton is not amenable to ultrasonic welding and there is always a discernable joint when the ends of a strip of Kapton are joined together to form a belt.

As mentioned above and is also discussed below, the porosity of the belt substrate is a key factor in providing some of the important characteristics of the belt of the invention (e.g., bulk conductivity and a seamless joint). In general, this porosity should be between about 0.1 CFM (cubic feet per minute) and about 25 CFM, and in a specific exemplary embodiment, the porosity was 8 CFM, where porosity is measured using the Frazier CFM test method as mentioned above. A relative indication of this porosity is the specific gravity of the substrates relative to specific gravity of the raw polymer from which the substrates are made. In a specific exemplary embodiment, the raw aramid polymer used has a specific gravity of 1.38 whereas the range of the aramid substrates that have been used is 0.3 to 0.6 and since there is no other component in the substrates, the difference in specific gravity is due to the porosity, i.e., the openness or voids, in the fiber-fibrid structure. In the example given, the specific gravity of the substrate is between about 20% to 50% of that of the raw polymer.

Considering the advantages of the invention with respect to the seam (or lack thereof) provided, as compared with conventional plastic film belts, and referring to FIG. 1, there are shown the two ends 10a and 10b of a continuous belt or belt substrate 10, these ends 10a and 10b being joined together by, e.g., ultrasonic welding, in a weld region W. As illustrated, a seam or step ("bump") is provided at the weld and this seam creates various disadvantages discussed above.

Referring to FIG. 2, an endless belt substrate 12 is shown wherein the ends 12a and 12b are joined together at a weld region W'. As shown, this joining together of the ends 12a and 12b is accomplished with a very small seam and in practice, little or no seam is produced when the ends of the belt substrate are joined by ultrasonic welding.

FIGS. 3 and 4 illustrate the manner in which the latter technique can be carried out using a movable anvil 14 that forms a base against which the welding is accomplished, and an ultrasonic welding horn indicated at 16. In this embodiment, one end, e.g., end 12b, of a cut flat sheet of the belt substrate 12 is fixed to anvil 14. It is noted that in order to carry out the manufacture of wide belts, the anvil 14 is typically placed on an air-actuated or motor driven slide mechanism (not shown) so as to enable anvil 14 to transverse during the welding operation as indicated by arrow 18. In the next pre-welding step, the other end, e.g., end 12a, of substrate 12 is brought up and affixed to anvil 14 in an overlapping manner with respect to the first end 12b. The amount of overlap is typically on the order of 0.030 inches. The ultrasonic horn 16 is brought down on top of the overlapped material and ultrasonic energy is transmitted therefrom to the overlapped region or joint. Ultrasonic welding is well known per se and provides for converting electrical energy into vibratory mechanical energy at ultrasonic frequencies, this vibratory energy being transferred to the parts being welded together by means of, in the case, ultrasonic horn 16. This ultrasonic energy from horn 16 causes melting and hence joining together of the parts. The anvil 14 is then transversed, i.e., moved in the direction of arrow 18, in order to provide a seam along the entire width of the belt. As noted above, the use of ultrasonic welding with the porous substrate material results in an essentially smooth weld, i.e., there is minimal increase in the thickness of the weld.

As mentioned above, the conductive coating of the belt of the invention can be applied in different ways. Referring to 5(a), a belt 20 is shown which comprises a substrate 22 having a coating 24a on one (the upper) surface thereof As shown in FIG. 5(b), coatings, denoted 24b, can be applied to both surfaces of substrate 22. Further, as illustrated in FIG. 5(c) a coating, denoted 24c, can be applied to all surfaces, including the edge or lateral surfaces, or as shown in FIG. 5(d), a coating, denoted 24d, can be applied to the top and edge surfaces. It is also noted that the coating can be preferentially applied to one side as compared to another side, i.e., so that a different thickness is applied to the two sides.

EXAMPLE

A substrate strip was used which was cut 10 inches wide and 14.030 inches long and had a thickness of 0.0035 inches. The substrate was polymer-based nonwoven material with a continuous operating temperature capability of 400° F. to 450° F. The polymer can be an "aramid" which is a type of polyamide and one trade of which is Nomex, manufactured by E.I. Dupont. A "spunbonded" process was used in making the substrate. This strip was ultrasonically welded using the technique described above to form a continuous belt having width of 10 inches and a circumference of 14 inches. As explained previously, depending on the choice of substrate material, a seam thickness equal to, or slightly greater than, the substrate itself can be achieved. In general, this increase is less than about 15% and is typically about 5%. As discussed above, it is believed that this lack of a seam is in a large part due to the porosity of the substrate material, this porosity providing spaces within the overlapped ends that permit the material of these ends to flow together during the welding process.

After formation of the substrate into a loop or belt, the belt was coated. A primer coat was applied to enhance adhesion of the top or final coat to the substrate. The primer coat was an isocyanate primer but other primers can be used. A light coating (on the order of 1% to 2% by weight) of the primer was used. In this example, the top coat was an EPDM compound with the ability to withstand an intermittent temperature of 350° F. to 400° F. As noted above, the top coat can be any of a number of polymers including polychloroprene (Neoprene), nitrile, urethane, and fluoroelastomers. Further, the coat or coats can be aqueous or solvent based, and layers of two or three of the above polymers can be applied to the same belt substrate.

In this example, the coating was applied to the inside of the belt substrate to a thickness of approximately 0.001 inches and to the outside to thickness of 0.004 inches. As discussed above, the coating can be applied equally to both sides of the belt substrate or preferentially to one side, depending on the requirements of the particular application of the finished belt. In this example, the finished belt thickness was 0.0085 (0.0035 inches for the substrate and 0.0050 for the coating).

The coating applied was conductive containing a loading of electrically conductive carbon black within the range of on the order of 40 to 90 parts per hundred of the raw polymer. As discussed above, this loading can vary depending on the choice of polymer and the particular balance of properties desired. Because of the porosity of the substrate, bulk conductivity was achieved as opposed to surface conductivity only. As a consequence, as described above, any adverse charge build up can be dissipated directly through the belt to ground, e.g., through a grounded pulley.

After application of the coating, the polymer belt was vulcanized or cured. The heat applied and time when applied is not critical and, in general, application of heat for sufficient period will effect adequate curing. A flat press, used with appropriate temperature and pressure, enables imparting of various different surface impressions or textures (from smooth to rough) with the proper choice of release sheets. Once the belt was cured, a final slitting procedure was used to provide a belt of the required width.

Although the present invention has been described relative to specific exemplary embodiments thereof, it will be understood by those skilled in the art that variations and modifications can be effected in these exemplary embodiments without departing from the scope and spirit of the invention.

What is claimed is:

1. A composite belt comprising:
   a substrate comprising an endless loop formed by a strip of a nonwoven, porous, open pore thermoplastic material having the ends thereof welded together by ultrasonic welding to form a weld region with substantially no increase in thickness, at the weld region;
   at least one electrically conductive elastomeric coating on said substrate, the combined thickness of said substrate and said coating being less than 0.015 inches; and
   the porosity of said substrate being between about 0.1 cubic feet per minute and 25 cubic feet per minute as measured in terms of the air flow rate through the substrate using the Frazier CFM test method.

2. A belt as claimed in claim 1 wherein said porosity is about 8 cubic feet per minute.

3. A belt as claimed in claim 1 wherein said thermoplastic material is a polyester.

4. A belt as claimed in claim 1 wherein said substrate material is an aramid.

5. A belt as claimed in claim 1 wherein said substrate material comprises a combination of short fibers and fibrids.

6. A belt as claimed in claim 1 wherein said substrate material comprises a randomly laid continuous fiber.

7. A belt as claimed in claim 1 wherein said elastomeric coating comprises a thermoplastic coating.

8. A belt as claimed in claim 1 wherein said elastomeric coating comprises a thermosetting coating.

9. A belt as claimed in claim 1 wherein said elastomeric coating comprises a compound selected from the group consisting of polychloroprene, nitrile, urethane, ethylene-propylene diene monomer and fluoroelastomers.

10. A belt as claimed in claim 1 wherein the melting temperature of said substrate material is at least 230° F.

11. A belt as claimed in claim 1 wherein the melting temperature of said substrate material is at least 300° F.

12. A belt as claimed in claim 1 wherein said substrate material is able to withstand melting in response to the intermittent temperatures of at least 350° F.

* * * * *